United States Patent

Masotti et al.

[11] Patent Number: 5,754,327
[45] Date of Patent: May 19, 1998

[54] DEVICE AND METHOD FOR DEFLECTING A LASER BEAM BY MEANS OF A SINGLE MIRROR

[75] Inventors: Leonardo Masotti, Sesto Fiorentino; Gabriele Clementi, Florence; Angelo Bove, Castellamare Di Stabia, all of Italy

[73] Assignee: EL.EN. S.p.A., Florence, Italy

[21] Appl. No.: 797,832

[22] Filed: Feb. 10, 1997

[30] Foreign Application Priority Data

Feb. 13, 1996 [IT] Italy .................. FI96A000024

[51] Int. Cl.$^6$ .................................. G02B 26/08
[52] U.S. Cl. ............... 359/198; 359/199; 359/213; 359/214; 359/225; 359/872
[58] Field of Search ................. 359/198–199, 359/213–214, 223–226, 230, 202, 872, 900; 310/36, 66; 384/215

[56] References Cited

U.S. PATENT DOCUMENTS

| | | |
|---|---|---|
| 4,157,861 | 6/1979 | Davies . |
| 5,239,361 | 8/1993 | Burch . |
| 5,519,198 | 5/1996 | Plesko .................. 359/214 |
| 5,557,444 | 9/1996 | Melville et al. ........... 359/199 |
| 5,668,655 | 9/1997 | Schweizer et al. ......... 359/198 |

FOREIGN PATENT DOCUMENTS

| | | |
|---|---|---|
| 901075 | 3/1985 | Belgium . |
| 0 051 331 A | 5/1982 | European Pat. Off. . |
| 0 389 115 A | 9/1990 | European Pat. Off. . |

*Primary Examiner*—James Phan
*Attorney, Agent, or Firm*—McGlew and Tuttle

[57] ABSTRACT

The device for deflecting a laser beam comprises a mirror (1) and means for orientating the mirror according to a predetermined equation for the controlled deflection of the laser beam (F). The mirror (1) is supported so that it can oscillate about two axes and the means for orientating the mirror comprise a plurality of electromagnets (11A, 11B, 15; 13A, 13B, 17) supplied with currents which are controlled and variable in time ($I_{15}$, $I_{17}$) to exert magnetic forces on said mirror (3).

10 Claims, 1 Drawing Sheet

DEVICE AND METHOD FOR DEFLECTING A LASER BEAM BY MEANS OF A SINGLE MIRROR

TECHNICAL FIELD

The present invention relates to a device and method for deflecting a laser beam, of the type comprising a mirror and means which orientate the mirror according to a predetermined equation to deflect a laser beam.

BACKGROUND ART

Lasers are currently used in numerous applications in which it is necessary to control the laser beam according to a specific motion equation. For example, a laser head in which the beam is deflected by reflection from two mirrors controlled by two galvanometers is commonly used for marking metals. Each mirror is made to oscillate in a controlled way about its own axis by the corresponding galvanometer, and the two axes are orthogonal with respect to each other. In this way, the outgoing beam can be deflected according to a system of coordinates and its path can be controlled to obtain the required working.

In the medical field, there are various treatments which make use of a laser beam controlled by means of a pair of galvanometers to execute a scanning movement.

The currently known deflection systems, using two mirrors controlled by corresponding galvanometers, are complicated and cumbersome.

The purpose of the present invention is to provide a laser beam deflection device which is more simple, compact and economical, and which permits a more extensive use of the beam, even in configurations and situations in which the ordinary deflection systems with double mirrors would be unsuitable.

DISCLOSURE OF THE INVENTION

Essentially, the device comprises a mirror supported in such a way that it can oscillate about two axes, and a plurality of electromagnets supplied with currents which are controlled and variable in time to exert magnetic forces on said mirror. Elastic forces which balance the magnetic forces also act on the mirror. By suitably varying the magnetic forces exerted by each electromagnet on the mirror it is possible to move the mirror about the two axes of oscillation, inclining it into one of the infinite number of planes passing through the point of intersection of the axes of rotation. In this way, a highly compact device is obtained, since it has only one mirror which can be moved about a centre of rotation by a single electromagnetic control system, instead of two mirrors, each oscillating about only one axis and controlled by its own actuator.

In practice, the system may have two pairs of pole pieces; a common electrical conductor is wound around the pole pieces of each pair. In this way, two couples (each consisting of the attractive and repulsive forces exerted by the corresponding two opposing pole pieces) act on the mirror. A particularly advantageous system is obtained in this way, since it is only necessary to control two currents (one for each pair of pole pieces) to control the movements of the mirror.

In practice, since it is advantageous to use a symmetrical system, the two pole pieces of each pair are mounted in positions diametrically opposed with respect to the mirror and at 90° to each other.

In a practical embodiment, the mirror is supported by means of a ball joint. An elastic member, for example a helical spring, which acts between a fixed mounting and the support of the mirror, is disposed around the joint. In a preferred embodiment, the elastic member consists of a toroidal body or a sleeve of elastic material, for example an elastomer or equivalent. The elastic member tends to return the mirror to a position of minimum energy, with the normal to its surface parallel to the axes of the pole pieces. When the electrical windings wound on the pole pieces generate magnetic forces on the mirror, said forces tend to move the mirror away from or toward its rest position, deforming the elastic member and thus generating the forces of elastic reaction. The position of the mirror is determined by the equilibrium between the magnetic forces and the elastic forces and varies as the intensity of the current in the various pole pieces is varied according to a specified equation.

The device may be used in numerous applications, which will be indicated at the end of the description of an embodiment of the device.

The invention also relates to a method of deflection specified in the attached claims.

BRIEF DESCRIPTION OF DRAWINGS

The invention will be more clearly understood from the description and the attached drawing, which shows a non-restrictive practical embodiment of the invention. In the drawing.

DETAILED DESCRIPTION OF AN EMBODIMENT OF THE INVENTION

Figure 1:
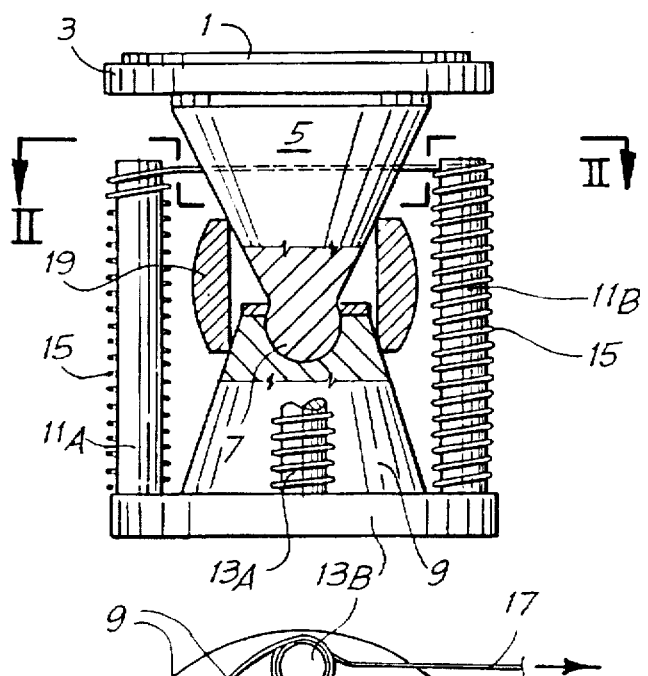
FIG. 1 shows a lateral view and partial section of the device according to the invention.
Figure 2:
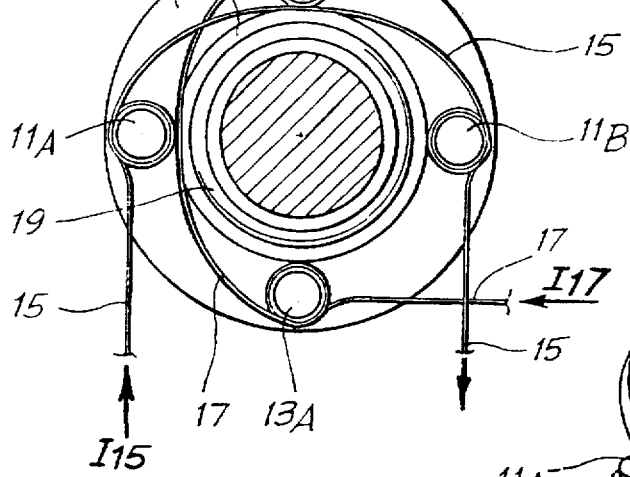
FIG. 2 shows a transverse section through II—II in FIG. 1.

The device comprises a mirror 1, which is circular in the example shown in the drawing, supported by a base 3 made of ferromagnetic material. The base is integral with a support 5 connected by means of a ball joint 7 to a mounting 9.

Figure 3:
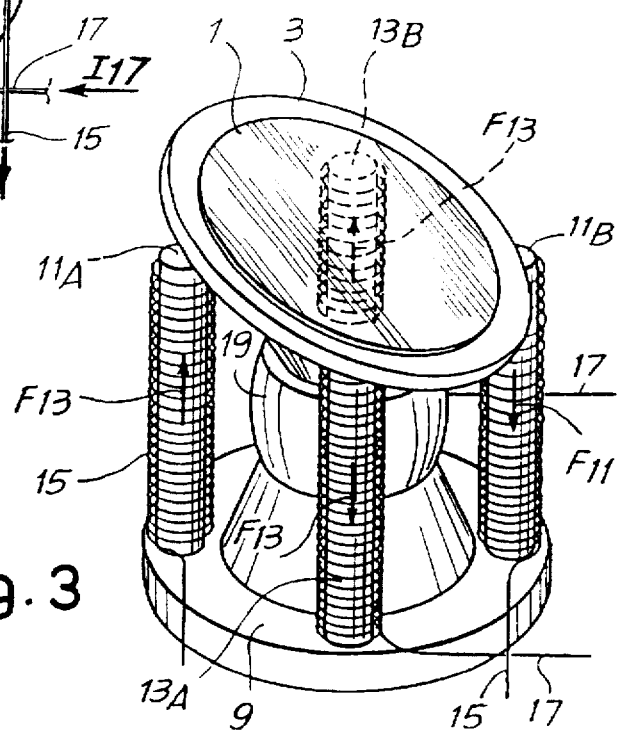
FIG. 3 shows a schematic perspective view of the device with parts removed.

Two pairs of pole pieces 11A, 11B and 13A, 13B are fixed to the mounting 9. The pole pieces of each pair are diametrically opposite each other. A first common conductor 15, through which is passed a current $I_{15}$ which is variable in time, is wound around the two pole pieces 11A, 11B of the first pair. A conductor 17, through which is passed a current $I_{17}$ which is also variable in time, is wound around the pole pieces 13A, 13B of the other pair. The passage of the currents $I_{15}$ and $I_{17}$ generates a magnetic induction flux which completes its circuit by passing through the supporting base 3 of the mirror 1. This produces an attractive force at one pole piece of each pair and a repulsive force at the opposite pole piece of each pair, which are exerted on the base 3 of the mirror 1. The forces are indicated in FIG. 3 and identified as $F_{11}$, $F_{13}$. Each pair of forces $F_{11}$, $F_{11}$ and $F_{13}$, $F_{13}$ causes the base 3 of the mirror to rotate about a corresponding axis; two axes are orthogonal with respect to each other and pass through the centre of the ball joint 7.

The forces $F_{11}$, $F_{13}$ exerted by the electromagnets consisting of the pole pieces 11, 13 and the corresponding windings 15, 17 are opposed by an elastic force exerted on the support 5 of an elastic sleeve 19 having a toroidal or equivalent shape, and made, for example, of elastomer. The elastic sleeve 19 rests on two truncated conical surfaces of the support 5 and of the mounting 9.

By suitably varying the currents $I_{15}$ and $I_{17}$ passing through the two conductors 15 and 17, a suitable inclination of the mirror 1 is achieved. By placing the device described above in the path of a laser beam (F), in a position such that the incoming beam from the source strikes the mirror 1, the rotation of the mirror about the centre of the ball joint 7 (caused by the combination of the forces $F_{15}$, $F_{17}$ and the elastic forces exerted by the elastic sleeve 19) causes a controlled deflection of the laser beam.

APPLICATIONS OF THE INVENTION

The device according to the invention may be used in numerous applications.

For example, it may be placed in a terminal unit of the arm of a laser instrument for various uses. An example of an arm in which the device may be used is described in U.S. Pat. No. 5,000,553. This arm has a plurality of mirrors at the joints. One of these mirrors, typically the last before the terminal unit, may consist of the mirror of the device described above.

A unit of this type can be used for the restoration of works of art or objets d'art, using a laser beam made to scan according to random or specific equations by means of the device described, in order to create an area of action of the laser beam around the point where the operator places the unit.

A further use of a unit of this type may be in the field of cosmetic medicine, for dermabrasion or in lipolysis, or in other treatments which require energy density and a programmed motion equation of the laser beam.

In the more purely industrial field, the device may be associated with a unit or a robot head for cleaning molds or in general for the use of the laser in all applications requiring a movement of the laser beam according to a known equation about an aiming direction.

Again in the field of medical applications, the device may be located in front of the ordinary conventional system of deflection with two mirrors with galvanometric scanning movement. In this way, the beam is pre-scanned when it arrives at the two mirrors, and thus a uniform distribution of energy about the aiming centre is created. This imparts the double advantage of creating an energy density controlled according to the laser power and the pre-scanning configuration and velocity, and of increasing safety for the patient in the therapeutic use of the laser, since the stopping of the scanning galvanometers of the usual scanning system does not cause any burning of the patient due to a high energy density which would be produced if the laser beam were stationary.

The device can also be used for marking or other industrial applications in which a scanning system with galvanometers and a double mirror is normally used. If necessary, the device can be mounted on a system of slides which control its movement in two Cartesian axes, so that by moving the device it is also possible to work very large surfaces.

It is to be understood that the drawing shows only one example provided solely as a practical demonstration of the invention, and that this invention may be varied in its forms and dimensions without departure from the scope of the guiding principle of the invention. Any presence of reference numbers in the attached claims has the purpose of facilitating reading of the claims with reference to the description and to the drawing, and does not limit the scope of protection represented by the claims.

We claim:

1. A device for deflecting a laser beam, the device comprising:

a mirror;

a support member for supporting said mirror, said support member having a frusto-conical shape;

a mounting member pivotally connected to said support member, said mounting member having a frusto-conical shape, conical portions of said mounting member and said support member being opposed to one another;

a joint member connecting said support member to said mounting member, said support member and said mounting member being tapered toward said joint member;

a plurality of electromagnetic means arranged around said support means, said electromagnetic means being supplied with currents which are controlled and variable in time to exert magnetic forces on said mirror for orienting said mirror and deflecting the laser beam;

elastic means for biasing said mirror with elastic forces opposing said magnetic forces, said elastic means including an elastic sleeve arranged around said joint member.

2. The device as claimed in claim 1, wherein said electromagnetic means includes two pairs of pole pieces, and a common electrical conductor being wound around the pole pieces of each pair.

3. The device as claimed in claim 2, wherein the two pole pieces of each pair are mounted in positions diametrically opposed with respect to the mirror and at 90° to each other.

4. The device as claimed in claim 1, wherein said joint member is a ball joint.

5. The device as claimed in claim 1, wherein said elastic sleeve is made of elastomer.

6. A method for deflecting a laser beam, wherein said beam is reflected by a deflecting mirror, said deflecting mirror being fixed to a support member which is pivotably connected to a mounting member, said mirror being made to oscillate in a controlled way by applying a system of varied magnetic forces to said mirror which causes the mirror to oscillate about two intersecting axes, and in which said magnetic forces are balanced with a system of elastic forces formed by an elastic sleeve around a connection of said support member to said mounting member.

7. The method as claimed in claim 6, wherein said magnetic forces are generated by two pairs of electromagnets supplied with two currents ($I_{15}$, $I_{17}$) which are controlled to cause the controlled oscillation of the mirror.

8. A device for deflecting a laser beam, the device comprising:

a mounting member having a conical shape;

a support member pivotally connected to said mounting member with a joint member, said support member having a conical shape, said conical shape of said mounting member and said support member tapering down toward said joint member;

a mirror connected to said support member;

electromagnetic means mounted on said mounting member and for applying a plurality of magnetic forces on said support member;

elastic means for biasing said support member into a position with elastic forces, said elastic forces opposing said magnetic forces in order to have said mirror pivotally move to another position where said magnetic forces and said elastics forces are in equilibrium, said elastic means including an elastic sleeve positioned around said joint member connecting said mounting member to said support member.

9. A device in accordance with claim 8, wherein said joint member is a ball joint.

10. A device in accordance with claim 8, wherein said elastic sleeve is formed of elastomer.

* * * * *